US012586724B2

(12) United States Patent
Yun et al.

(10) Patent No.: US 12,586,724 B2
(45) Date of Patent: Mar. 24, 2026

(54) MULTILAYERED CAPACITOR INCLUDING THIN FILM INCLUDING BARIUM ZIRCONIUM TITANATE ON CAPACITOR BODY

(71) Applicant: SAMSUNG ELECTRO-MECHANICS CO., LTD., Suwon-si (KR)

(72) Inventors: Kimyoung Yun, Suwon-si (KR); Joon Yeob Cho, Suwon-si (KR); Ahyoung Shin, Suwon-si (KR); Myunghwa Choi, Suwon-si (KR); Hyeonju Yang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 120 days.

(21) Appl. No.: 18/521,445

(22) Filed: Nov. 28, 2023

(65) Prior Publication Data

US 2024/0274358 A1      Aug. 15, 2024

(30) Foreign Application Priority Data

Feb. 13, 2023    (KR) ........................ 10-2023-0018695

(51) Int. Cl.
| | |
|---|---|
| *H01G 4/224* | (2006.01) |
| *H01G 4/12* | (2006.01) |
| *H01G 4/232* | (2006.01) |
| *H01G 4/30* | (2006.01) |

(52) U.S. Cl.
CPC .......... *H01G 4/224* (2013.01); *H01G 4/1227* (2013.01); *H01G 4/1236* (2013.01); *H01G 4/30* (2013.01); *H01G 4/2325* (2013.01)

(58) Field of Classification Search
None
See application file for complete search history.

(56) References Cited

U.S. PATENT DOCUMENTS

| | | | |
|---|---|---|---|
| 5,672,378 A | 9/1997 | Maher et al. | |
| 2013/0314841 A1* | 11/2013 | Oguni .................. | H01G 4/1245 |
| | | | 361/301.4 |
| 2014/0185183 A1 | 7/2014 | Park et al. | |
| 2015/0049413 A1 | 2/2015 | Wada et al. | |
| 2015/0055273 A1 | 2/2015 | Endo et al. | |

(Continued)

FOREIGN PATENT DOCUMENTS

| | | |
|---|---|---|
| JP | 6841611 B2 | 3/2021 |
| KR | 10-1509145 B1 | 3/2015 |
| KR | 10-2414829 B1 | 6/2022 |

OTHER PUBLICATIONS

The Extended European Search Report dated Jul. 9, 2024 issued in European Patent Application No. 23217102.5.

*Primary Examiner* — Eric W Thomas
(74) *Attorney, Agent, or Firm* — Morgan, Lewis & Bockius LLP

(57) ABSTRACT

A multilayered capacitor that includes a capacitor body including a dielectric layer and an internal electrode, an external electrode disposed outside the capacitor body, and a thin film disposed on a surface of the capacitor body and including barium zirconium titanate. The barium zirconium titanate includes zirconium in an amount of about 10 parts by mole to about 50 parts by mole based on about 100 parts by mole of titanium.

20 Claims, 7 Drawing Sheets

(56) References Cited

U.S. PATENT DOCUMENTS

| 2015/0279565 | A1 | 10/2015 | Teraoka et al. |
| 2016/0005543 | A1 | 1/2016 | Wada et al. |
| 2017/0278633 | A1* | 9/2017 | Kato .................... H01G 4/2325 |
| 2018/0025844 | A1 | 1/2018 | Sato et al. |
| 2019/0006107 | A1* | 1/2019 | Kim ....................... H01G 4/012 |
| 2019/0279816 | A1 | 9/2019 | Taniguchi et al. |
| 2020/0035415 | A1 | 1/2020 | Kwon et al. |
| 2021/0020375 | A1* | 1/2021 | Park ..................... H01G 4/2325 |
| 2022/0139616 | A1 | 5/2022 | Kang et al. |
| 2022/0181082 | A1* | 6/2022 | Ham ....................... B32B 18/00 |
| 2023/0250024 | A1* | 8/2023 | Fuse ....................... B32B 18/00 |
| | | | 501/137 |
| 2024/0266113 | A1* | 8/2024 | Sasaki ................. H01G 4/1227 |

* cited by examiner

MULTILAYERED CAPACITOR INCLUDING THIN FILM INCLUDING BARIUM ZIRCONIUM TITANATE ON CAPACITOR BODY

CROSS-REFERENCE TO RELATED APPLICATION

This application claims priority to and the benefit of Korean Patent Application No. 10-2023-0018695 filed in the Korean Intellectual Property Office on Feb. 13, 2023, the entire contents of which are incorporated herein by reference.

TECHNICAL FIELD

This disclosure relates to a multilayered capacitor and a manufacturing method thereof.

BACKGROUND

Since IT devices have achieved higher performance, a multilayered capacitor (MLCC) of high capacity is also required.

This high capacity may be achieved by increasing a volume fraction of an active region constituting the multilayered capacitor but decreasing that of the other cover or margin region not contributing to capacity of the multilayered capacitor.

However, when the margin ratio is reduced, moisture resistance reliability and mechanical strength may be deteriorated.

SUMMARY

One aspect of the present disclosure provides a multilayered capacitor in which a high capacity may be ensured by increasing a volume fraction of an active region and decreasing a volume fraction of a capacity non-contributing region, while a dense thin film is disposed on the surface of the capacitor body to inhibit the formation of penetration paths for moisture, water vapor, and hydrogen, thereby improving moisture resistance reliability and preventing mechanical strength degradation.

A multilayered capacitor according to one aspect includes a capacitor body including a dielectric layer and an internal electrode, an external electrode disposed on the capacitor body, and a thin film disposed on a surface of the capacitor body and including barium zirconium titanate.

The barium zirconium titanate includes zirconium in an amount of about 10 parts by mole to about 50 parts by mole based on about 100 parts by mole of titanium.

The barium zirconium titanate may include zirconium in an amount of about 20 parts by mole to about 40 parts by mole based on about 100 parts by mole of titanium.

An average thickness of the thin film may be about 0.1 μm to about 3 μm.

The capacitor body may include a cover portion disposed on the dielectric layer and the internal electrode in a stacking direction.

The thin film may be disposed on the cover portion.

The capacitor body may have a first side and a second side perpendicular to a stacking direction of the dielectric layer and the internal electrode.

The external electrode may be disposed on the first side.

The capacitor body may further include a margin portion disposed on the second side.

The thin film may be disposed on the margin portion.

The multilayered capacitor may further include an oxide layer between the capacitor body and the thin film.

The oxide layer may include barium zirconium titanate.

$z_2$ may be greater than $z_1$, in which $z_1$ is mol % of oxygen relative to the total barium zirconium titanate in the thin film and $z_2$ is mol % of oxygen relative to the total barium zirconium titanate in the oxide layer.

$y_1:y_2$=about 100:70 to about 100:97, in which $y_1$ is mol % of zirconium relative to the total barium zirconium titanate in the thin film and $y_2$ is mol % of zirconium relative to the total barium zirconium titanate in the oxide layer.

In addition, $z_1:z_2$=about 100:103 to about 100:140.

An average thickness of the oxide layer may be less than or equal to about 5 μm.

A multilayered capacitor according to another aspect includes a capacitor body including a dielectric layer and an internal electrode, an external electrode disposed on the capacitor body, a thin film disposed on the capacitor body, and an oxide layer disposed between the capacitor body and the thin film.

The thin film and oxide layer include barium zirconium titanate.

$z_2$ may be greater than $z_1$, in which $z_1$ is mol % of oxygen relative to the total barium zirconium titanate in the thin film and $z_2$ is mol % of oxygen relative to the total barium zirconium titanate in the oxide layer.

$y_1: y_2$=about 100:70 to about 100:97, in which $y_1$ is mol % of zirconium relative to the total barium zirconium titanate in the thin film and $y_2$ is mol % of zirconium relative to the total barium zirconium titanate in the oxide layer.

In addition, $z_1:z_2$=about 100:103 to about 100:140.

The barium zirconium titanate of the thin film may include zirconium in an amount of 20 parts by mole to 40 parts by mole based on about 100 parts by mole of titanium.

An average thickness of the thin film may be about 0.1 μm to about 3 μm.

An average thickness of the oxide layer may be less than or equal to about 5 μm.

The capacitor body may include a cover portion disposed on the dielectric layer and the internal electrode in the stacking direction.

The oxide layer may be disposed on the cover portion.

The capacitor body may have a first side and a second side perpendicular to a stacking direction of the dielectric layer and the internal electrode.

The external electrode may be disposed on the first side.

The capacitor body may further include a margin portion disposed on the second side.

The oxide layer may be disposed on the surface of the margin portion.

A method of manufacturing a multilayered capacitor according to another aspect includes preparing a dielectric green sheet and forming a conductive paste layer on a surface of the dielectric green sheet; stacking the dielectric green sheet with the conductive paste layer to form a dielectric green sheet stack; coating a composition for forming a thin film on the dielectric green sheet stack; firing the dielectric green sheet stack to form a capacitor body; and forming an external electrode on the capacitor body.

The composition for forming the thin film includes zirconium oxide.

The thin film may be formed to include barium zirconium titanate, and the barium zirconium titanate may include zirconium in an amount of about 10 parts by mole to about 50 parts by mole based on about 100 parts by mole of titanium.

In the multilayered capacitor according to one aspect, high capacity may be ensured by increasing a volume fraction of an active region and decreasing a volume fraction of a capacity non-contributing region, while a dense thin film is disposed on the surface of the capacitor body to inhibit the formation of penetration paths for moisture, water vapor, and hydrogen, thereby improving moisture resistance reliability and preventing mechanical strength degradation.

DETAILED DESCRIPTION OF THE EMBODIMENTS

Figure 1:
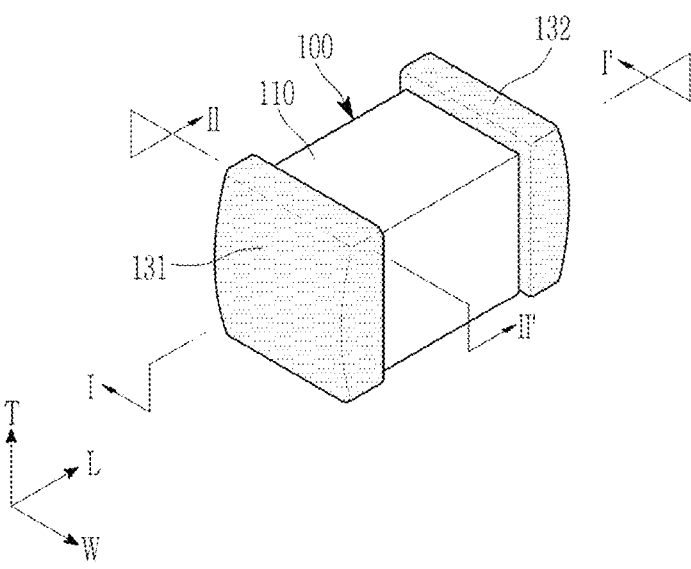
FIG. 1 is a perspective view illustrating a multilayered capacitor according to one aspect.

The present disclosure will be described more fully hereinafter with reference to the accompanying drawings, in which aspects of the disclosure are shown. The drawings and description are to be regarded as illustrative in nature and not restrictive. Like reference numerals designate like elements throughout the specification. Further, the accompanying drawings are provided only in order to allow aspects disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include," "comprise," "have," or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Figure 2:
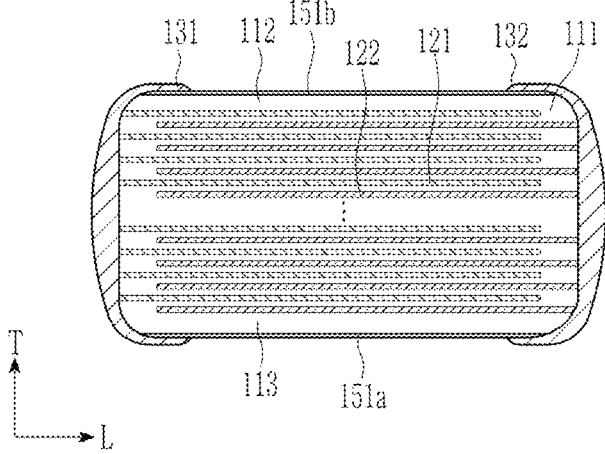
FIG. 2 is a cross-sectional view of the multilayered capacitor taken along line I-I' of FIG. 1.
Figure 3:
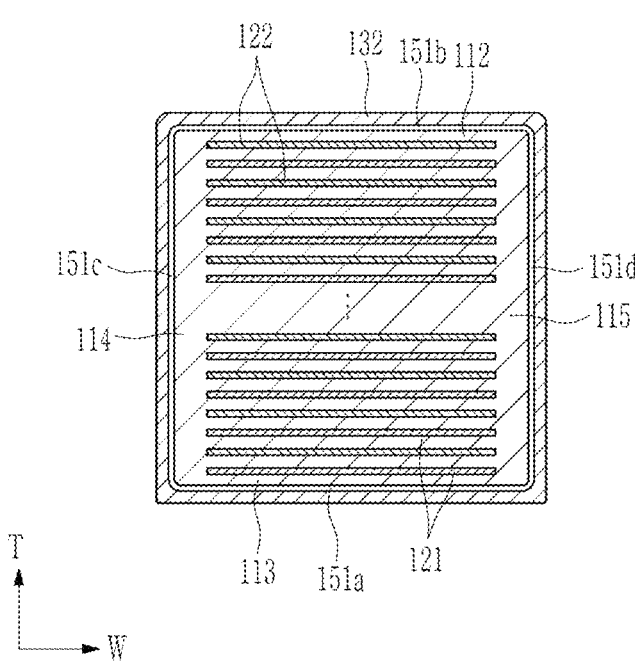
FIG. 3 is a cross-sectional view of the multilayered capacitor taken along line II-II' of FIG. 1.
Figure 4:
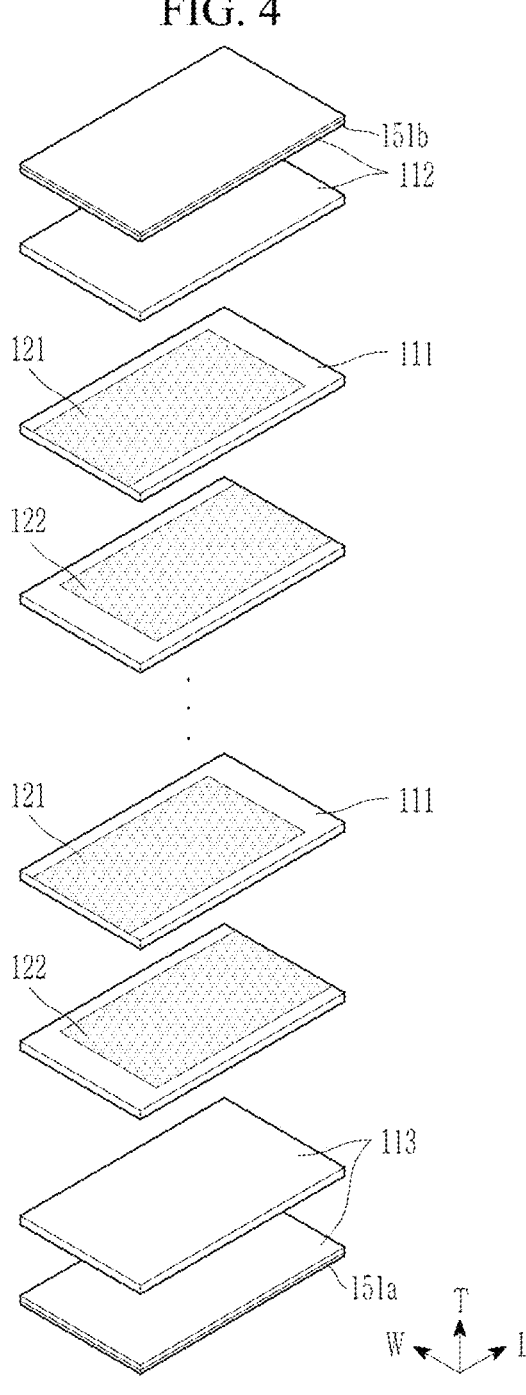
FIG. 4 is an exploded perspective view illustrating a stacked structure of internal electrodes in the capacitor body of FIG. 1.

FIG. 1 is a perspective view illustrating a multilayered capacitor 100 according to one aspect, FIG. 2 is a cross-sectional view of the multilayered capacitor 100 taken along line I-I' of FIG. 1, FIG. 3 is a cross-sectional view of the multilayered capacitor 100 taken along line II-II' of FIG. 1, and FIG. 4 is an exploded perspective view illustrating a stacked structure of internal electrodes in the capacitor body 110 of FIG. 1.

When directions are defined to clearly describe the present aspect, the L-axis, W-axis, and T-axis indicated in the drawings represent the longitudinal direction, the width direction, and the stacking direction of the capacitor body 110, respectively. Herein, the stacking direction (T-axis direction) may be a direction perpendicular to the wide surface (main surface) of the sheet-shaped components, and may be, for example, used in the same concept as the thickness direction of the dielectric layer 111. The longitudinal direction (L-axis direction) may be a direction substantially perpendicular to the stacking direction (T-axis direction) in a direction extending parallel to the wide surface (main surface) of the sheet-shaped components, and may be, for example, a direction in which the first and second external electrodes 131 and 132 are disposed. The width direction (W-axis direction) may be a direction that extends parallel to the wide surface (main surface) of the sheet-shaped components and is substantially perpendicular to the stacking direction (T-axis direction), and the length of the sheet-like components in the longitudinal direction (L-axis direction) may be longer than the length in the width direction (W-axis direction).

Referring to FIGS. 1 to 4, the multilayered capacitor 100 according to the present aspect may include the capacitor body 110, first and second external electrodes 131 and 132 disposed at both ends of the capacitor body 110 which face each other in the longitudinal direction (L-axis direction), and thin films 151*a*, 151*b*, 151*c*, and 151*d* on the surface of the capacitor body 110.

The capacitor body 110 may have, for example, a substantially hexahedral shape.

In this aspect, for convenience of explanation, in the capacitor body 110, surfaces opposite to each other in the stacking direction (T-axis direction) are defined as first and second surfaces, surfaces connected to the first and second surfaces and facing each other in the longitudinal direction (L-axis direction) are defined as third and fourth surfaces, and surfaces connected to the first and second surfaces, connected to the third and fourth surfaces, and facing each other in the width direction (W-axis direction) are defined as fifth and sixth surfaces. For example, the third or fourth surface may be a surface on the first surface perpendicular to the stacking direction (T-axis direction), and the fifth or sixth surface may be a surface on the second surface perpendicular to the stacking direction (T-axis direction).

For example, the first surface, which is a lower surface, may be a surface facing a mounting direction. In addition, the first to sixth surfaces may be flat, but the present aspect is not limited thereto, for example, the first to sixth surfaces may be curved surfaces with a convex central portion, and an edge of each surface which is a boundary, may be round.

The shape and dimensions of the capacitor body 110 and the number of stacked dielectric layers 111 are not limited to those shown in the drawings of the present embodiment.

The capacitor body 110 is formed by stacking a plurality of the dielectric layers 111 in the stacking direction (T-axis direction) and then sintering them, and includes a plurality of dielectric layers 111, and first and second internal electrodes 121 and 122 which are alternately disposed in the stacking direction (T-axis direction) with the dielectric layers 111 interposed therebetween.

Herein, the boundary between the respective dielectric layers 111 adjacent to each other of the capacitor body 110 may be integrated to the extent that it is difficult to check without using a scanning electron microscope (SEM).

Also, the capacitor body 110 may include an active region and cover portions 112 and 113.

The active region contributes to generating a capacitance of the multilayered capacitor 100. For example, the active region may be a region in which the first and second internal electrodes 121 and 122 are stacked and overlapped with each other along the stacking direction (T-axis direction).

The cover portions 112 and 113 may be respectively disposed on the first and the second surfaces of the active region in the stacking direction (T-axis direction) as stacking-direction margin portions. The cover portions 112 and 113 may be formed by stacking a single dielectric layer 111 or two or more dielectric layers 111 on an upper surface and a lower surface of the active region, respectively.

In addition, the capacitor body 110 may further include width-direction margin portions 114 and 115. The margin portions 114 and 115 may be respectively disposed on the fifth and sixth surfaces of the active region. Such margin portions 114 and 115 may be formed by coating a conductive paste layer for forming internal electrodes on the surface of the dielectric green sheet only to a portion of the surface of the dielectric green sheet, stacking dielectric green sheets on which a conductive paste layer is not coated on both side surfaces of the dielectric green sheet, and firing the same.

The cover portions 112 and 113 and margin portions 114 and 115 serve to prevent damage to the first and second internal electrodes 121 and 122 due to physical or chemical stress.

For example, the dielectric layer 111 may include a ceramic material having a high dielectric constant. For example, the ceramic material may include a dielectric ceramic containing components such as $BaTiO_3$, $CaTiO_3$, $SrTiO_3$, $CaZrO_3$, and the like. In addition, auxiliary components such as a Mn compound, an Fe compound, a Cr compound, a Co compound, and a Ni compound may be further included in addition to these components. For example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, etc. are partially dissolved in $BaTiO_3$-based dielectric ceramics.

In addition, a ceramic powder, a ceramic additive, an organic solvent, a plasticizer, a binder, a dispersant, and the like may be further added to the dielectric layer 111. The ceramic additive may include, for example, transition metal oxide or transition metal carbide, a rare earth element, magnesium (Mg), or aluminum (Al), and the like.

For example, an average thickness of the dielectric layer 111 may be about 0.5 μm to about 10 μm. In one example, the term "about" may refer to a concept including a minute difference caused by a process error. For example, "about a value" may include not only a case of being "the value", but also a case of having a minute difference caused by a process error or a measurement, recognizable by one of ordinary skill in the art.

The first and second internal electrodes 121 and 122 are electrodes having different polarities, and are alternately disposed to face each other along the stacking direction (T-axis direction) with the dielectric layer 111 interposed therebetween, and one end thereof may be exposed through the third and fourth surfaces of the capacitor body 110.

The first and second internal electrodes 121 and 122 may be electrically insulated from each other by the dielectric layer 111 disposed in the middle.

Ends of the first and second internal electrodes 121 and 122 alternately exposed through the third and fourth surfaces of the capacitor body 110 are connected to the first and second external electrodes 131 and 132, respectively, to be electrically connected.

The first and second internal electrodes 121 and 122 may include a conductive metal, for example, a metal such as Ni, Cu, Ag, Pd, Au, and the like, an alloy thereof, for example a Ag—Pd alloy.

Also, the first and second internal electrodes 121 and 122 may include dielectric particles having the same composition as the ceramic material included in the dielectric layer 111.

The first and second internal electrodes 121 and 122 may be formed using a conductive paste containing a conductive metal. As a method of printing the conductive paste, a screen-printing method or a gravure printing method or the like may be used.

For example, an average thickness of the first and second internal electrodes 121 and 122 may be about 0.1 μm to about 2 μm.

Thin films 151a, 151b, 151c, and 151d are disposed on the surfaces of the capacitor body 110.

For example, the thin films 151a and 151b may be disposed outside the cover portions 112 and 113 of the capacitor body 110 in the stacking direction (T-axis direction), for example, on the first and second surfaces thereof.

As will be described later, when the first and second external electrodes 131 and 132 extend to portions of the first and second surfaces, the thin films 151a and 151b may be disposed inside the first and second external electrodes 131 and 132 on the first and second surfaces, that is, between the capacitor body 110 and the first and second external electrodes 131 and 132.

In addition, the thin films 151c and 151d may be disposed on the surfaces of the margin portions 114 and 115 of the capacitor body 110, for example, on the fifth and sixth surfaces thereof. Accordingly, the thin films 151a, 151b, 151c, and 151d may surround all the surfaces of the capacitor body 110 excluding the third and fourth surfaces where the first and second external electrodes 131 and 132 are disposed. The thin films 151a, 151b, 151c, and 151d may improve air-tightness of the outer portion of the capacitor body 110 to suppress moisture, water vapor, and hydrogen from forming penetration paths and thus improve moisture resistance reliability.

An average thickness of the thin films 151a, 151b, 151c, and 151d may be about 0.1 μm to about 3 μm.

For example, the average thickness of the thin films 151a, 151b, 151c, and 151d may be analyzed by examining cross section samples of the capacitor body 110 cut at the center (½ point) of the width direction (W-axis direction) in the longitudinal direction (L-axis direction) and the stacking direction (T-axis direction) or cross-section samples cut at the center (½ point) of the longitudinal direction (L-axis direction) in the width direction (W-axis direction) and stacking direction (T-axis direction) with a scanning electron microscope (SEM), a scanning transmission electron microscope (STEM), or the like. In addition, the average thickness may be obtained by measuring a thickness at least 3, 5, or 10 different points or on the cross-section and then calculating an arithmetic mean thereof.

The cross-section samples of the capacitor body 110 may be, for example, prepared by putting the multilayered capacitor 100 in an epoxy mixed solution to cure it, polishing the capacitor body 110, and fixing and maintaining it in a vacuum atmosphere chamber.

The scanning electron microscope may be, for example, Verios G4 manufactured by Thermofisher Scientific Inc., and the measurement conditions are about 10 KV and about 0.2 nA.

When the thin films 151a, 151b, 151c, and 151d have an average thickness of less than about 0.1 μm, the moisture resistance improvement effect may be insignificant, and when the average thickness is greater than about 3 μm, porous bodies are formed between the thin films 151a, 151b, 151c, and 151d and the cover portions 112 and 113, or the margin portions 114 and 115, rather deteriorating the moisture resistance characteristics.

The thin films 151a, 151b, 151c, and 151d may include barium zirconium titanate.

Zirconium (Zr) is an element added in a small amount to a barium titanate ($BaTiO_3$) ferroelectric which is a main raw material or a dispersion medium mixed in the powder form with barium titanate particles and is thus simultaneously fired with barium titanate.

When added over a predetermined amount, the zirconium (Zr) plays a role of planarizing temperature-dependent capacity change (TCC) as a depressor or inducing a room temperature shift of the temperature-dependent capacity change (TCC) to control temperature characteristics, but when added in a small amount, the zirconium (Zr) plays a role of mainly suppressing grain growth. In addition, when an excessive amount of the zirconium (Zr) is added to the barium titanate, the barium zirconium titanate is formed with rapid grain growth and densification, forming a dielectric with high density. The thin films 151a, 151b, 151c, and 151d include this barium zirconium titanate with high density and may suppress moisture, water vapor, and hydrogen from forming penetration paths, improving the moisture resistance reliability and in addition, improving mechanical strength.

The barium zirconium titanate of the thin films 151a, 151b, 151c, and 151d may include the zirconium in an amount of about 10 parts by mole to about 50 parts by mole, for example, about 20 parts by mole to about 40 parts by mole based on about 100 parts by mole of titanium.

For example, in the thin films 151a, 151b, 151c, and 151d, specific element (e.g., Ba, Ti, and Zr) components may be measured by using nano-XRF, for example, Nano-Synchrotron X-Ray Fluorescence (Nano-SXRF). Herein, the measurement may be conducted by using ID16A-NI(UPBL04) made by ESRF (European Synchrotron Radiation Facility). For example, the prepared cross-section samples of the capacitor body 110 are irradiated by synchrotron X-rays (10 keV or more) to measure a content of the specific elements (e.g., Ba, Ti, and Zr) in the thin films 151a, 151b, 151c, and 151d at least 3 times, 5 times, or 10 times repeatedly and obtain an average thereof and also, to average minimum values and maximum values at at least 3, 5, or 10 different points in the same thin films 151a, 151b, 151c, and 151d and obtain final contents of the specific elements.

When the content of zirconium in the thin films 151a, 151b, 151c, and 151d is less than about 10 parts by mole, the thin films 151a, 151b, 151c, and 151d may not be uniform, but when the content of zirconium in the thin films 151a, 151b, 151c, and 151d is greater than about 50 parts by mole, the thin films 151a, 151b, 151c, and 151d may also not be uniform due to formation of Ba—Zr-based secondary phases.

Figure 5:
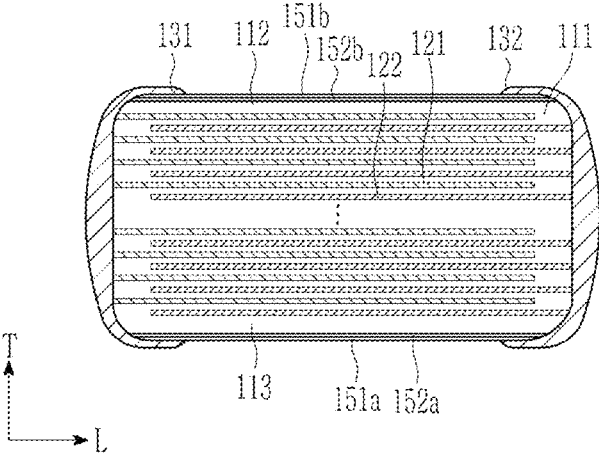
FIG. 5 is a cross-sectional view of a multilayered capacitor according to an exemplary variation of one aspect.
Figure 6:
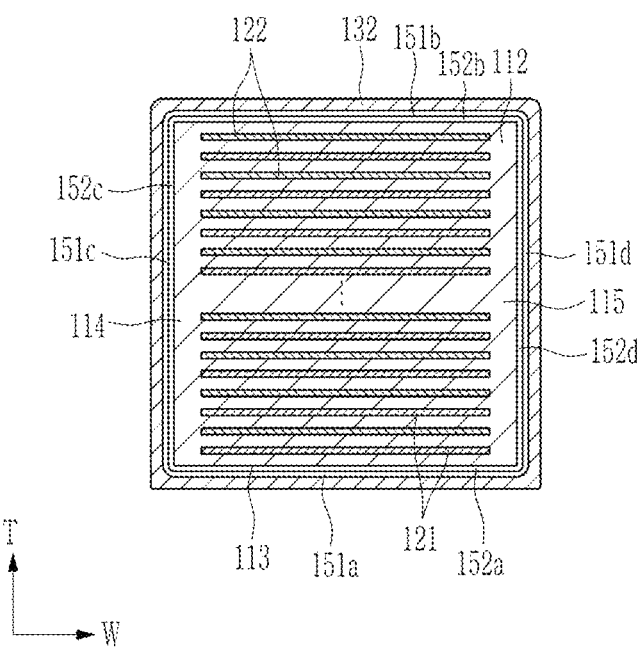
FIG. 6 is a cross-sectional view of a multilayered capacitor according to an exemplary variation of one aspect.

FIGS. 5 and 6 are cross-sectional views of multilayered capacitors 10 according to an exemplary variation of one aspect.

Referring to FIGS. 5 and 6, the multilayered capacitor 100 further includes oxide layers 152a, 152b, 152c, and 152d between the capacitor body 110 and the thin films 151a, 151b, 151c, and 151d.

The oxide layers 152a, 152b, 152c, and 152d are disposed on the surfaces of the capacitor body 110.

For example, the oxide layer 152a, and 152b may be disposed outside the cover portions 112 and 113 of the capacitor body 110 in the stacking direction (T-axis direction), for example, on the first and second surfaces thereof. Herein, the thin films 151a and 151b may be disposed on the oxide layers 152a and 152b outside the capacitor body 110 in the stacking direction (T-axis direction).

In addition, the oxide layers 152c and 152d may be disposed on the surfaces of the margin portions 114 and 115 of the capacitor body 110, for example, the fifth and sixth surfaces thereof. Accordingly, the oxide layers 152a, 152b, 152c, and 152d may surround all the surfaces of the capacitor body 110 excluding the third and fourth surfaces where the first external electrode 131 and the second external electrode 132 are disposed. Herein, the thin films 151c and 151d may be disposed on the oxide layers 152c and 152d outside the capacitor body 110 in the width direction (W-axis direction).

The oxide layers 152a, 152b, 152c, and 152d may further improve the moisture resistance reliability of the outer portion of the capacitor body 110.

An average thickness of the oxide layers 152a, 152b, 152c, and 152d may be about 0 μm to about 5 μm, for example, about 0.1 μm to about 3 μm. The average thickness of the oxide layers 152a, 152b, 152c, and 152d may be measured in the same method as the method of measuring the average thickness of the thin films 151a, 151b, 151c, and 151d and thus will not be re-illustrated. When the average thickness of the oxide layers 152a, 152b, 152c, and 152d is greater than about 5 μm, porous bodies are formed between the thin films 151a, 151b, 151c, and 151d and the cover portions 112 and 113, the margin portions 114 and 115, or the oxide layers 152a, 152b, 152c, and 152d, rather deteriorating the moisture resistance characteristics.

The oxide layers 152a, 152b, 152c, and 152d like the thin films 151a, 151b, 151c, and 151d may include barium zirconium titanate. However, the barium zirconium titanate of the oxide layers 152a, 152b, 152c, and 152d has a higher oxidation degree than that of the thin films 151a, 151b, 151c, and 151d.

For example, based on a total mol % of the barium zirconium titanate of the thin films 151a, 151b, 151c, and 151d, mol % of barium is $x_1$, mol % of zirconium is $y_1$, and mol % of oxygen is $z_1$, and based on a total mol % of the barium zirconium titanate of the oxide layers 152a, 152b, 152c, and 152d, mol % of barium is $x_2$, mol % of zirconium is $y_2$, mol % of oxygen is $z_2$, wherein $z_2$ may be larger than $z_1$.

Herein, in the thin films 151a, 151b, 151c, and 151d and the oxide layers 152a, 152b, 152c, and 152d, specific element (e.g., Ba, Ti, and Zr) contents, which are $x_1$, $y_1$, $z_1$, $x_2$, $y_2$, and $z_2$, are measured in the same method as the method of the specific element contents in the thin films 151a, 151b, 151c, and 151d, which will not be repeatedly illustrated.

For example, $z_1:z_2$=about 100:103 to about 100:140. In addition, $y_1:y_2$=about 100:70 to about 100:97. When $z_2:z_1$ is less than about 103:100 or $y_2:y_1$ is less than about 3:100, the oxide layers 152a, 152b, 152c, and 152d may not be observed by a scanning electron microscope (SEM), and when $z_2:z_1$ is greater than about 140:100 or when $y_2:y_1$ is greater than about 30:100, nonuniform grain growth occurs, forming the porous bodies.

The first and second external electrodes 131 and 132 are supplied with voltages of different polarities, and are electrically connected to exposed portions of the first and second internal electrodes 121 and 122, respectively.

According to the above configuration, when a predetermined voltage is applied to the first and second external electrodes 131 and 132, charges are accumulated between the first and second internal electrodes 121 and 122. At this time, a capacitance of the multilayered capacitor 100 is proportional to an overlapping area of the first and second internal electrodes 121 and 122 overlapping each other along the stacking direction (T-axis direction) in the active region.

The first and second external electrodes 131 and 132 may respectively include a first connection portion and a second connection portion disposed on the third and fourth surfaces of the capacitor body 110 and connected to the first and second internal electrodes 121 and 122, and may also include a first band portion and a second band portion disposed at each corner where the third and fourth surfaces, and the first and second surfaces or the fifth and sixth surfaces of the capacitor body 110 meet.

The first and the second band portions may extend from the first connection portion and the second connection portion to portions of the first and second surfaces or the fifth and sixth surfaces of the capacitor body 110, respectively. The first and the second band portions may serve to improve adhesion strength of the first and second external electrodes 131 and 132.

In one example, the first and the second external electrodes 131 and 132 may each include a sintered metal layer in contact with the capacitor body 110, a conductive resin layer configured to cover the sintered metal layer, and a plating layer configured to cover the conductive resin layer.

The sintered metal layer may include a conductive metal and glass.

In one example, the sintered metal layer may be a conductive metal and may include copper (Cu), nickel (Ni), silver (Ag), palladium (Pd), gold (Au), platinum (Pt), tin (Sn), tungsten (W), titanium (Ti), lead (Pb), an alloy thereof, or a combination thereof, and for example, the copper (Cu) may include a copper (Cu) alloy. When the conductive metal includes copper, a metal other than copper may be included in an amount of less than or equal to about 5 parts based on 100 parts by mole of copper.

In one example, the sintered metal layer may include a composition of glassy oxide, for example one or more selected from a silicon oxide, a boron oxide, an aluminum oxide, a transition metal oxide, an alkali metal oxide, and an alkaline-earth metal oxide. Herein, the transition metal may be selected from zinc (Zn), titanium (Ti), copper (Cu), vanadium (V), manganese (Mn), iron (Fe), and nickel (Ni), the alkali metal may be selected from lithium (Li), sodium (Na), and potassium (K), and the alkaline-earth metal may be selected from magnesium (Mg), calcium (Ca), strontium (Sr), and barium (Ba).

In the sintered metal layer, contents of the conductive metal and the glass are not particularly limited, but an average area of the conductive metal on the cross-section (cross-section in the L-axis direction and T-axis direction) perpendicular to the stacking direction (W-axis direction) of the multilayered capacitor 100 may be, for example, about 30% to about 90% or about 70% to about 90% of a total area of the sintered metal layer.

Optionally, the conductive resin layer is formed on the sintered metal layer and, for example, may entirely cover the sintered metal layer. On the other hand, the first external electrode 131 and the second external electrode 132 may not include the sintered metal layer. The conductive resin layer may directly contact the capacitor body 110.

The conductive resin layer extends toward the first and the second surfaces or the fifth and sixth surfaces of the capacitor body 110. A length of a region (i.e., band portion) disposed by the conductive resin layer extending to the first and the second surfaces or the fifth and sixth surfaces of the capacitor body 110 may be longer than that of a region (i.e., band portion) disposed by the sintered metal layer extending to the first and the second surfaces or the fifth and sixth surfaces of the capacitor body 110. In other words, the conductive resin layer may be formed on the sintered metal layer and may entirely cover the sintered metal layer.

The conductive resin layer includes a resin and a conductive metal.

The resin included in the conductive resin layer is not particularly limited, as long as the resin has bondability and impact absorption and is mixed with the conductive metal powder into a paste, and, for example, may include a phenol resin, an acrylic resin, a silicone resin, an epoxy resin, or a polyimide resin.

The conductive metal included in the conductive resin layer may play a role of electrically connecting the first internal electrode 121 and the second internal electrode 122 or the sintered metal layer.

The conductive metal included in the conductive resin layer may have a spherical shape, a flake shape, or a combination thereof. In other words, the conductive metal may have the flake shape alone or the spherical shape alone, but the flake shape and the spherical shape may be mixed.

Herein, the spherical shape may not be a perfectly spherical shape, for example, a length ratio of a major axis to a minor axis (major axis/minor axis) may be about 1.45 or less. The flake-shaped powder means powder having a flat and elongated shape, and the length ratio of the major axis to the minor axis (major axis/minor axis) is not particularly limited but for example, about 1.95 or more.

The first and second external electrodes 131 and 132 may further include a plating layer outside the conductive resin layer.

The plating layer is nickel (Ni), copper (Cu), tin (Sn), palladium (Pd), platinum (Pt), gold (Au), silver (Ag), tungsten (W), titanium (Ti), or lead (Pb), alone or an alloy thereof. For example, the plating layer may be a nickel (Ni) plating layer or a tin (Sn) plating layer, and may have a form in which a nickel (Ni) plating layer and a tin (Sn) plating layer are sequentially stacked or a tin (Sn) plating layer, a nickel (Ni) plating layer, and a tin (Sn) plating layer are sequentially stacked. In addition, the plating layer may include a plurality of nickel (Ni) plating layers and/or a plurality of tin (Sn) plating layers.

The plating layer may improve mountability of the multilayered capacitor 100 with a board, structural reliability, external durability, heat resistance, and equivalent series resistance (ESR).

A method of manufacturing a multilayered capacitor according to another aspect includes manufacturing a capacitor body including a dielectric layer and an internal electrode, and forming an external electrode outside the capacitor body.

First, the manufacturing of the capacitor body is described.

In the manufacturing process of the capacitor body, a dielectric slurry formed into a dielectric layer after firing, and a conductive paste formed into an internal electrode after firing are prepared.

The dielectric slurry is, for example, prepared by mixing the barium titanate ($BaTiO_3$) as main component powder with subcomponent powder to obtain mixed powder of the main component and the subcomponent. For example, the subcomponent powder may be $BaCO_3$, $MgCO_3$, $SiO_2$, $Al_2O_3$, $Dy_2O_3$, $Mn_3O_4$, $V_2O_5$, or a combination thereof in any content.

The dielectric slurry may optionally further include a solvent and an additive together with the mixed powder of the main component and the subcomponent.

The additive may be a dispersant, a binder, or a plasticizer, and, for example, may further include other additives such as a lubricant, an antistatic agent, etc.

The dispersant may be, for example, a phosphoric acid ester-based dispersant or a polycarboxylic acid-based dispersant. A content of the dispersant may be about 0.1 parts by weight to about 5 parts by weight or about 0.3 parts by weight to about 3 parts by weight, based on about 100 parts by weight of the mixed powder of the main component and the subcomponent. When the content of the dispersant is about 0.1 parts by weight to about 5 parts by weight, the dispersant may have sufficient effects and reduce impurities in the dielectric layer.

The binder may be for example an acrylic resin, a polyvinylbutyl resin, a polyvinylacetal resin, or an ethyl cellulose resin. The content of the binder may be about 0.1 parts by weight to about 50 parts by weight or about 3 parts by weight to about 30 parts by weight, based on about 100 parts by weight of the mixed power of the main component and the subcomponent. When the content of the binder is about 0.1 parts by weight to about 50 parts by weight, the binder may have sufficient effects and reduce impurities in the dielectric layer.

The plasticizer may include, for example a phthalate-based plasticizer such as dioctyl phthalate, benzyl butyl phthalate, dibutyl phthalate, dihexyl phthalate, di(2-ethyl-hexyl) phthalate (DOP), or di(2-ethyl butyl) phthalate, an adipate-based plasticizer such as dihexyl adipate, or di(2-ethylhexyl) adipate (DOA), a glycol-based plasticizer such as ethylene glycol, diethylene glycol, or triethylene glycol, a glycol ester-based plasticizer such as triethylene glycol dibutyrate, triethylene glycol di(2-ethyl dibutyrate), or tri-ethylene glycol di(2-ethylhexanoate). A content of the plasticizer may be about 0.1 parts by weight to about 20 parts by weight or about 1 part by weight to about 10 parts by weight, based on about 100 parts by weight of the mixed power of the main component and the subcomponent. When the content of the plasticizer may be about 0.1 parts by weight to about 20 parts by weight, the plasticizer may have sufficient effects and reduce impurities in the dielectric layer.

The solvent may include, for example an aqueous solvent such as water, an alcohol-based solvent such as ethanol, methanol, or benzyl alcohol, or methoxy ethanol, a glycol-based solvent such as ethylene glycol, or diethylene glycol, a ketone-based solvent such as acetone, methyl ethyl ketone, methyl isobutyl ketone, or cyclohexanone, an ester-based solvent such as butyl acetate, ethyl acetate, carbitol acetate, or butyl carbitol acetate, an ether-based solvent such as methyl cellosolve, ethyl cellosolve, butyl ether, or tetrahydrofuran, an aromatic based solvent such as benzene, toluene, or xylene. Considering the solubility or dispersibility of various additives in the dielectric slurry, an alcohol-based solvent or aromatic solvent may be used as a solvent. A content of the solvent may be about 50 parts by weight to about 1000 parts by weight or about 100 parts by weight to about 500 parts by weight, based on about 100 parts by weight of the mixed power of the main component and the subcomponent. When the content of the solvent may be about 50 parts by weight to about 1000 parts by weight, the main component, the subcomponent, and additives, etc., may be sufficiently mixed, and the solvent may be easily removed in the following process.

The mixing of the main component and the subcomponent may be performed by using a wet ball mill or a stirring mill. When zirconia balls are used in the wet ball mill, a plurality of zirconia mills with a diameter of about 0.1 mm to about 10 mm are used for about 8 hours to about 48 hours or about 10 hours to about 24 hours.

Next, the dielectric slurry is molded into a sheet shape.

The dielectric slurry may be molded into a sheet shape, for example a doctor blade method, or a tape-forming method such as the calender roll method, for example using an on-roll forming coater with head discharge, and then dried to obtain a dielectric green sheet.

The conductive paste for the internal electrode is prepared by kneading conductive powder made of a conductive metal or an alloy thereof with a binder or a solvent. The conductive paste for the internal electrode may include ceramic powder (for example, barium titanate powder) as a co-material, if necessary. The co-material may act to suppress sintering of the conductive powder during the firing process.

On the surface of the dielectric green sheet, the conductive paste for the internal electrode is coated in a predetermined pattern by various printing methods such as screen printing or a transfer method. After stacking a plurality of layers of dielectric green sheets on which internal electrode patterns are formed, a dielectric green sheet stack is obtained by pressing in the stacking direction. At this time, the dielectric green sheets and internal electrode patterns may be stacked so that the dielectric green sheets may be disposed on the upper and lower surfaces of the dielectric green sheet stack in the stacking direction.

Optionally, the obtained dielectric green sheet stack may be cut into predetermined dimensions by dicing or the like.

Next, a composition for forming a thin film is coated on the surface of the dielectric green sheet stack.

The composition for forming the thin film includes zirconium oxide. In addition, the composition for forming the thin film may further include a solvent and an additive, and the additive may be a dispersant, a binder, or a plasticizer, and, for example, may further include other additives such as a lubricant, an antistatic agent, etc. Description of the solvent and additives are the same as those described in the dielectric slurry, and will not be repeatedly illustrated again.

The composition for forming the thin film may be coated on the entire surfaces of the dielectric green sheet stack, for example, on the first, second, third, fourth, fifth, and sixth surfaces. Or, the composition for forming the thin film may be coated on the first, second, fifth, and sixth surfaces excluding the third and fourth surfaces where the first and second external electrodes are supposed to be formed. When the composition for forming a thin film is coated on the third and fourth surfaces, as will be described later, the thin films disposed on the third and fourth surfaces may be removed by a surface treatment about the third and fourth surfaces, which is a pre-treatment process for forming the first and second external electrodes.

In addition, the dielectric green sheet stack may be solidified and dried to remove the plasticizer, etc. and barrel-polished by using a centrifugal barrel machine or the like after the solidification-drying. In the barrel polishing, the dielectric green sheet stack is put with a medium and a polishing liquid into a barrel container, and then the barrel container is applied with rotational motion or vibration to polish unnecessary parts such as burrs and the like generated during the cutting. In addition, after the barrel polishing, the dielectric green sheet stack is washed with a cleaning solution such as water and the like and dried.

The dielectric green sheet stack is treated to remove the binder and fired, obtaining the capacitor body.

The binder removal may be performed under conditions appropriately adjusted according to a main component composition of the dielectric layer or a main component composition of the internal electrode. For example, the binder removal may be performed by increasing a temperature at about 5° C./hr to about 300° C./h and maintaining about 180° C. to about 400° C. for about 0.5 h to about 24 h. The binder removal may be performed under an air atmosphere or a reducing atmosphere.

The firing treatment may be performed under conditions appropriately adjusted according to the main component composition of the dielectric layer or the main component composition of the internal electrode. For example, the firing may be performed at about 1200° C. to about 1350° C. or about 1220° C. to about 1300° C. for about 0.5 hours to about 8 hours or about 1 hour to about 3 hours. The firing may be performed under a reducing atmosphere, for example, an atmosphere in which a mixed gas of nitrogen $(N_2)$ and hydrogen $(H_2)$ is humidified. When the internal electrode includes nickel (Ni) or a nickel (Ni) alloy, an oxygen partial pressure may be about $1.0 \times 10^{-14}$ MPa to about $1.0 \times 10^{-10}$ MPa under the firing atmosphere.

In this way, the composition for forming a thin film including zirconium oxide is coated on all the surfaces of the dielectric green sheet stack, and then simultaneously fired with the dielectric green sheet stack to induce a strong reduction reaction on the surfaces, forming a thin film with high density including barium zirconium titanate on the capacitor body surfaces. In addition, an oxide layer including more oxidized barium zirconium titanate than the barium zirconium titanate of the thin film may also be formed between the capacitor body and the thin film.

After the firing treatment, annealing may be performed, if needed. The annealing is performed for re-oxidizing the dielectric layer, and when the firing is performed under a reducing atmosphere, the annealing may be performed. The annealing may be performed under conditions appropriately adjusted according to the main component composition and the like of the dielectric layer. For example, the annealing may be performed at about 950° C. to about 1150° C. for greater than about 0 h and less than about 20 h by increasing the temperature at about 50° C./h to about 500° C./h. The annealing may be performed under a humid nitrogen gas $(N_2)$ atmosphere, wherein an oxygen partial pressure may be about $1.0 \times 10^{-9}$ MPa to about $1.0 \times 10^{-5}$ MPa.

In the binder removal treatment, the firing treatment, or the annealing treatment, in order to humidify nitrogen gas, a mixed gas, or the like, a wetter or the like may be, for example, used, wherein a water temperature may be about 5° C. to about 75° C. The binder removal treatment, the firing treatment, and the annealing treatment may be performed continuously or independently.

Optionally, the third and fourth surfaces of the obtained capacitor body may be surface-treated through sandblasting, laser irradiation, barrel polishing, or the like. This surface treatment may expose the ends of the first and second internal electrodes on the outer surfaces of the third and fourth surfaces, thereby improving the electrical connection of the first and second external electrodes and first and second internal electrodes and easily forming the alloy portion.

An external electrode is formed on the outer surface of the obtained capacitor body.

For example, a sintered metal layer may be formed by coating a paste for forming a sintered metal layer on an external electrode and then sintering the paste to form a sintered metal layer.

The paste for forming the sintered metal layer may include a conductive metal and glass. The conductive metal and glass are the same as described above and will not be repeatedly illustrated again. In addition, the paste for forming a sintered metal layer may optionally include a subcomponent such as a binder, a solvent, a dispersant, a plasticizer, or oxide powder, and the like. For example, the binder may include ethyl cellulose, acryl, butyral, or the like, and the solvent may include an organic solvent such as terpineol, butyl carbitol, alcohol, methylethylketone, acetone, or toluene, and the like, or an aqueous solvent.

A method of coating the paste for forming the sintered metal layer on the outer surface of the capacitor body may include various printing methods such as a dip method, screen printing, and the like, a coating method by using a dispenser, a spray method by using a spray, and the like. The paste for forming the sintered metal layer may be coated on at least the third and fourth surfaces of at least capacitor body, and optionally, on a portion of the first, second, fifth, or sixth surface where the band portions of the first and second external electrodes are formed.

Subsequently, the capacitor body on which the paste for forming the sintered metal layer is coated is dried and then sintered at a temperature of about 700° ° C. to about 1000° C. for about 0.1 h to about 3 h to form a sintered metal layer.

Optionally, on the outer surface of the obtained capacitor body, a paste for forming a conductive resin layer is coated and cured to form a conductive resin layer.

The paste for forming the conductive resin layer may include a resin, and optionally a conductive metal or a non-conductive filler. The conductive metal and the resin are the same as described above, and will not be repeatedly illustrated again. In addition, the paste for forming the conductive resin layer may optionally include a subcomponent such as a binder, a solvent, a dispersant, a plasticizer, or oxide powder, and the like. For example, the binder may include ethyl cellulose, acryl, butyral, or the like, and the solvent may include an organic solvent such as terpineol, butyl carbitol, alcohol, methylethylketone, acetone, or toluene, and the like or an aqueous solvent.

For example, a method of forming the conductive resin layer may include dipping the capacitor body 110 into the paste for forming the conductive resin layer to form the conductive resin layer and curing it, screen-printing or gravure-printing the paste for forming the conductive resin layer on the surface of the capacitor body 110, or coating the paste for forming the conductive resin layer, and then curing it.

Subsequently, a plating layer is formed outside the conductive resin layer.

For example, the plating layer may be formed by a plating method, or may be formed by sputtering or electroplating (electric deposition).

Hereinafter, specific embodiments of the invention are presented. However, the examples described below are only for specifically illustrating or explaining the invention, and the scope of the invention is not limited thereto.

Preparation Example: Manufacturing of Multilayered Capacitor

A dielectric slurry is prepared by using $BaTiO_3$ powder with an average particle size of 200 nm as a main component, additives including $BaCO_3$, $MgCO_3$, $SiO_2$, $Al_2O_3$, $Dy_2O_3$, $Mn_3O_4$, and $V_2O_5$, ethanol, and toluene as a solvent with zirconia balls as dispersion media and mixing them with a dispersant and a binder and then bead-milling the mixture.

The prepared dielectric slurry is coated and molded into a sheet with a thickness of 1.0 μm or less, preparing a dielectric green sheet. On the molded dielectric green sheet, a nickel (Ni) electrode is printed. On the other hand, cover sheets (each thickness of 3 μm) are stacked into 30 layers to form upper and lower cover portions. The dielectric green sheet is stacked with the upper and lower cover portions and then pressed and cut, manufacturing a dielectric green sheet stack. The cutting is performed by using a cutter into a size of 1.0 mm×0.5 mm and 0.6 mm×0.3 mm.

On the surface of the dielectric green sheet stack, a composition for forming a thin film including zirconium oxide is coated. In the composition for forming a thin film, a content of zirconium oxide may be controlled to adjust a mole ratio of zirconium to 100 parts by mole of titanium of barium zirconium titanate in the formed thin film.

The dielectric green sheet stack is calcined to remove binder and then fired under a reduction atmosphere of 0.1% $H_2$/99.9% $N_2$ ($H_2O/H_2/N_2$ atmosphere) at 1050° ° C. to 1250° C. for 1 hour and heat-treated under an $N_2$ atmosphere at 1000° C. for 3 hours. On the outside of the fired capacitor body, an external electrode is formed with a Cu paste through a termination process and electrode firing.

EXPERIMENTAL EXAMPLES

Each multilayered capacitor according to the examples and the comparative examples is manufactured by adjusting the mole ratio of zirconium to 100 parts by mole of titanium of barium zirconium titanate in the preparation example as shown in Table 1.

Regarding the manufactured multilayered capacitors, a content of zirconium to 100 parts by mole of titanium of barium zirconium titanate in each thin film, presence or absence of an oxide layer, presence or absence of surface pores, a size change of dielectric grains, and moisture resistance reliability are measured, and the results are shown in Table 1.

In the thin film, the content of zirconium is measured in the following method.

Each cross-section sample of the multilayered capacitors is obtained by putting and curing the multilayered capacitors in an epoxy mixed solution, polishing the surfaces of the capacitor body in the longitudinal direction (L-axis direction) and the stacking direction (T-axis direction) to a half point toward the width direction (W-axis direction), and then fixing and maintaining them under a vacuum atmosphere chamber.

A Nano-Synchrotron X-Ray Fluorescence (Nano-SXRF) analysis of the cross-section samples of the capacitor bodies is performed by using ID16A-NI (UPBL04) made by ESRF (European Synchrotron Radiation Facility). Herein, each mole ratio of barium (Ba), titanium (Ti), and oxygen (O) in each thin film is repeatedly measured three times by irradiating synchrotron X-rays (10 keV or more). In addition, each final mole ratio of barium (Ba), titanium (Ti), and oxygen (O) is obtained by calculating an average value of minimum values and maximum values measured at ten different points on the same cross-section.

In Table 1, when an oxide layer is present, "O" is given, but when not present, "X" is given.

Figure 7:
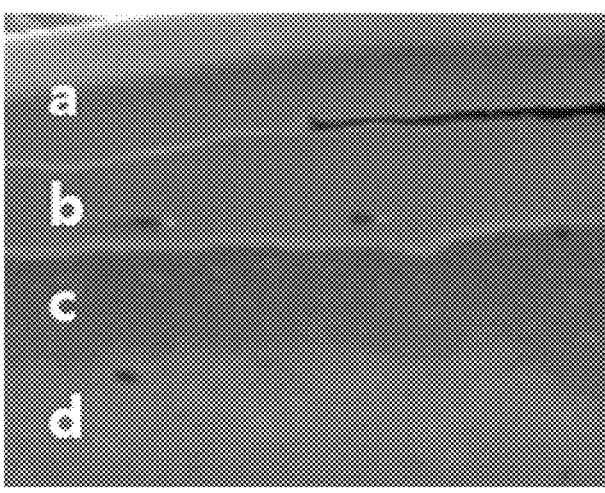
FIG. 7 is a scanning electron micrograph of a cross-sectional sample of the multilayered capacitor manufactured in Example 1.

FIG. 7 is a scanning electron micrograph of a cross-sectional sample of the multilayered capacitor manufactured in Example 1. In FIG. 7, a is a coating layer using FIB (Focused Ion Beam) for examining the cross-section, b is the thin film, c is the oxide layer, and d is a cover layer. Referring to FIG. 7, in the multilayered capacitor according to Example 1, the thin film and the oxide layer are formed.

When the surface pores are present, "O" is given, but when not present, "X" is given, wherein "O" is judged as N.G.

The size change of dielectric grains is evaluated by giving "O" when the dielectric grains from the surface of the thin film to a depth of 500 nm have an average size of greater than 70% of that of the dielectric grains in the cover portion or margin portion, but "X" when 70% or less, wherein "X" is judged as N.G.

The moisture resistance reliability is evaluated with ESPEC (PR-3J, 8585) equipment by giving "O", when the number of the multilayered capacitors maintained for 20 hours or more under conditions of 85° C., relative humidity (R.H.) of 85%, and 32 V is 20% or more, but "X", when the number of the multilayered capacitors is less than 20%, wherein "X" is judged as N.G.

The presence or absence of the oxide layer, the presence or absence of surface pores, the size change of dielectric grains, and the moisture resistance reliability are measured, and the results are shown in Table 1.

TABLE 1

|  | Mole ratios of Zr in the thin film (relative to 100 moles of Ti) | Presence of oxide layer | Presence of surface pores | Size changes of dielectric grains | Moisture resistance reliability |
|---|---|---|---|---|---|
| Comparative Example 1 | 3 | X | X | X | X |
| Comparative Example 2 | 5 | X | X | X | X |
| Example 1 | 10 | O | X | X | O |
| Example 2 | 30 | O | X | X | O |
| Example 3 | 50 | O | X | X | O |
| Example 4 | 55 | O | X | O | O |
| Example 5 | 60 | O | X | O | O |
| Comparative Example 3 | 65 | O | O | O | X |

Referring to Table 1, when the content of zirconium (Zr) is low, there is no significant effect, but when the content of zirconium (Zr) is excessively high, a concentration of zirconium increases with a rapid grain growth of the thin film rapidly grows, forming pores on the surface, which is accompanied by a decrease in a size of dielectric grains on the surface.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A multilayered capacitor, comprising:
a capacitor body including a dielectric layer and an internal electrode;
an external electrode disposed on the capacitor body;
a thin film disposed on a surface of the capacitor body and including barium zirconium titanate; and
an oxide layer disposed between the capacitor body and the thin film and including barium zirconium titanate,
wherein the barium zirconium titanate includes zirconium in an amount of about 10 parts by mole to about 50 parts by mole based on about 100 parts by mole of titanium.

2. The multilayered capacitor of claim 1, wherein the barium zirconium titanate includes zirconium in an amount of about 20 parts by mole to about 40 parts by mole based on about 100 parts by mole of titanium.

3. The multilayered capacitor of claim 1, wherein an average thickness of the thin film is about 0.1 μm to about 3 μm.

4. The multilayered capacitor of claim 1, wherein the capacitor body includes a cover portion disposed on the dielectric layer and the internal electrode in a stacking direction, and
the thin film is disposed on the cover portion.

5. The multilayered capacitor of claim 1, wherein the capacitor body has a first side and a second side perpendicular to a stacking direction of the dielectric layer and the internal electrode,
the external electrode is disposed on the first side,
the capacitor body further includes a margin portion disposed on the second side, and
the thin film is disposed on the margin portion.

6. The multilayered capacitor of claim 1, wherein $z_2$ is greater than $z_1$, in which $z_1$ is mol % of oxygen relative to the total barium zirconium titanate in the thin film and $z_2$ is mol % of oxygen relative to the total barium zirconium titanate in the oxide layer.

7. The multilayered capacitor of claim 6, wherein $y_1:y_2$=about 100:70 to about 100:97, in which $y_1$ is mol % of zirconium relative to the total barium zirconium titanate in the thin film and $y_2$ is mol % of zirconium relative to the total barium zirconium titanate in the oxide layer.

8. The multilayered capacitor of claim 6, wherein $z_1:z_2$=about 100:103 to about 100:140.

9. The multilayered capacitor of claim 1, wherein an average thickness of the oxide layer is less than or equal to about 5 μm.

10. The multilayered capacitor of claim 1, wherein
the thin film includes a material different from the dielectric layer, and is spaced apart from the internal electrode.

11. The multilayered capacitor of claim 10, wherein an average thickness of the thin film is about 0.1 μm to about 3 μm.

12. The multilayered capacitor of claim 10, wherein the capacitor body includes a cover portion disposed on the dielectric layer and the internal electrode in a stacking direction, and
the thin film is disposed on the cover portion.

13. The multilayered capacitor of claim 10, wherein the capacitor body has a first side and a second side perpendicular to a stacking direction of the dielectric layer and the internal electrode,
the external electrode is disposed on the first side,
the capacitor body further includes a margin portion disposed on the second side, and
the thin film is disposed on the margin portion.

14. A multilayered capacitor, comprising:
a capacitor body including a dielectric layer and an internal electrode;
an external electrode disposed on the capacitor body;
a thin film disposed on the capacitor body; and
an oxide layer disposed between the capacitor body and the thin film,
wherein the thin film and the oxide layer include barium zirconium titanate,
$z_1:z_2$=about 100:103 to about 100:140, in which zi is mol % of oxygen relative to the total barium zirconium titanate in the thin film and $z_2$ is mol % of oxygen relative to the total barium zirconium titanate in the oxide layer.

15. The multilayered capacitor of claim 14, wherein $y_1:y_2$=about 100:70 to about 100:97, in which $y_1$ is mol % of zirconium relative to the total barium zirconium titanate in the thin film and $y_2$ is mol % of zirconium relative to the total barium zirconium titanate in the oxide layer.

16. The multilayered capacitor of claim 14, wherein the barium zirconium titanate of the thin film includes zirconium in an amount of about 20 parts by mole to about 40 parts by mole based on about 100 parts by mole of titanium.

17. The multilayered capacitor of claim 14, wherein an average thickness of the thin film is about 0.1 μm to about 3 μm.

18. The multilayered capacitor of claim 14, wherein an average thickness of the oxide layer is less than or equal to about 5 μm.

19. The multilayered capacitor of claim 14, wherein the capacitor body includes a cover portion disposed on the dielectric layer and the internal electrode in a stacking direction, and
the oxide layer is disposed on the cover portion.

20. The multilayered capacitor of claim 14, wherein the capacitor body has a first side and a second side perpendicular to a stacking direction of the dielectric layer and the internal electrode,
the external electrode is disposed on the first side,
the capacitor body further includes a margin portion disposed on the second side, and
the oxide layer is disposed on the margin portion.

* * * * *